(12) United States Patent
Nilsson et al.

(10) Patent No.: US 10,575,148 B2
(45) Date of Patent: Feb. 25, 2020

(54) AUTONOMOUS, MOBILE, AND NETWORK CONNECTED OUTPUT DEVICES

(71) Applicant: Intel Corporation, Santa Clara, CA (US)

(72) Inventors: Anders Nilsson, Svedala (SE); Mats Bergstrom, Malmo (SE)

(73) Assignee: Intel Corporation, Santa Clara, CA (US)

( * ) Notice: Subject to any disclaimer, the term of this patent is extended or adjusted under 35 U.S.C. 154(b) by 39 days.

(21) Appl. No.: 15/721,193

(22) Filed: Sep. 29, 2017

(65) Prior Publication Data

US 2019/0104377 A1 Apr. 4, 2019

(51) Int. Cl.
| | |
|---|---|
| *H04W 4/38* | (2018.01) |
| *H04W 4/02* | (2018.01) |
| *H04W 84/18* | (2009.01) |
| *G06T 19/00* | (2011.01) |
| *H04W 84/00* | (2009.01) |
| *G05B 17/02* | (2006.01) |
| *B60Q 3/12* | (2017.01) |

(52) U.S. Cl.
CPC .............. *H04W 4/38* (2018.02); *G06T 19/006* (2013.01); *H04W 4/02* (2013.01); *H04W 84/005* (2013.01); *H04W 84/18* (2013.01)

(58) Field of Classification Search
CPC ...... G05B 17/02; B60Q 2400/50; B60Q 3/12; G06T 19/006

USPC .......................................................... 700/76
See application file for complete search history.

(56) References Cited

U.S. PATENT DOCUMENTS

| | | | |
|---|---|---|---|
| 2015/0308642 A1* | 10/2015 | Vo ........................ | H04N 5/2256 362/648 |
| 2017/0290077 A1 | 10/2017 | Nilsson et al. | |
| 2018/0227369 A1* | 8/2018 | DuCray .............. | H04L 12/2803 |

* cited by examiner

*Primary Examiner* — Michael J Brown
(74) *Attorney, Agent, or Firm* — Grossman, Tucker, Perreault & Pfleger, PLLC

(57) ABSTRACT

The present disclosure is directed to systems and methods for providing a moveable output device capable of autonomous (i.e., localized decision-making within the device itself) or semi-autonomous (i.e., shared decision-making based on communications with one or more other moveable output devices and/or one or more remote resources). The moveable output device includes a surface coupling assembly to couple the device to a wall or ceiling and a propulsion system to move the device along the walls or ceiling. The device also includes an environmental detection system and a biometric detection system to collect environmental and/or biometric information used by the control circuitry to determine a routing for the device and to determine adjustments to one or more output system parameters. The routing and output parameters may be based on movements, gestures, and similar made by the subject.

24 Claims, 6 Drawing Sheets

AUTONOMOUS, MOBILE, AND NETWORK CONNECTED OUTPUT DEVICES

TECHNICAL FIELD

The present disclosure relates to automated, network-connected, output devices.

BACKGROUND

Output devices, such as spot or zonal luminaires and lights, and projection devices, are frequently static and are often fixture-mounted in ceilings and walls, limiting the usefulness of the device as a user moves about a room, building, or outdoor area. When a user moves about an area, currently the user must carry or wear a portable lighting or projection device. Augmented reality (AR) projectors display information and/or data on physical objects (i.e., directly on physical objects as opposed to superimposed on a display of the physical objects). Such augmented reality devices are typically stationary or positioned by the system user. Changing the position of a stationary light source is often impossible, or even when possible inconvenient, dangerous, and labor intensive. Other output devices, such as surveillance cameras, speakers, and sensors, suffer similar limitations.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
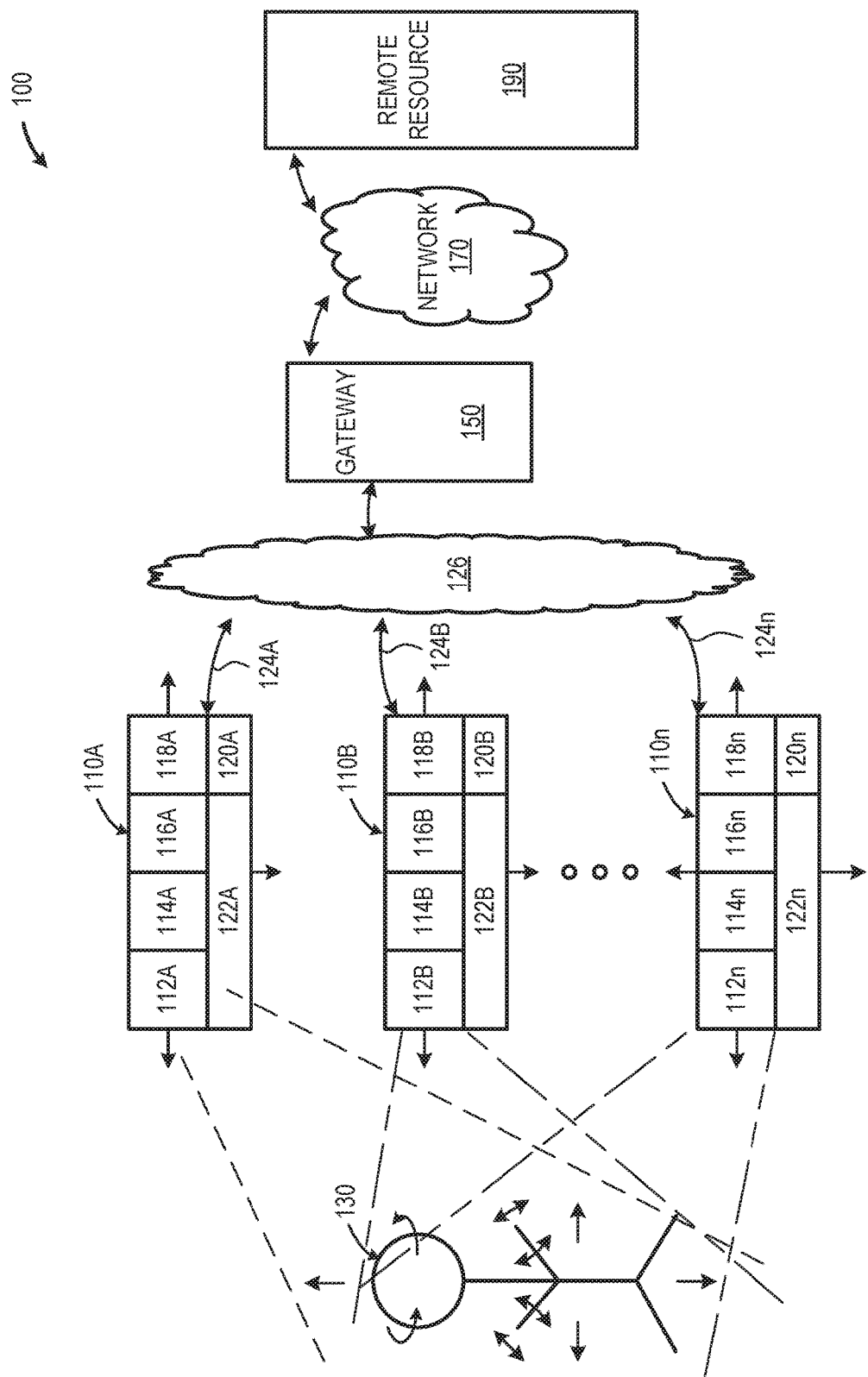
FIG. 1 depicts an illustrative system in which a plurality of output devices detect the movement, motion, or displacement parameters of a subject and autonomously move in, through, or across a two- or three-dimensional space based upon the received movement, motion, or displacement parameters of a subject, in accordance with at least one embodiment described herein.

Although the following Detailed Description will proceed with reference being made to illustrative embodiments, many alternatives, modifications and variations thereof will be apparent to those skilled in the art.

DETAILED DESCRIPTION

The systems and methods disclosed herein provide autonomously movable and network-connected output devices (e.g., lighting devices, projectors, audio output devices, sensors, and the like) externally attachable to ceilings and walls. The network connected output devices either receive or generate information and/or data representative of a desired location within a room or similar area to position the output device. The network connected output devices may additionally receive information and/or data representative of a desired output (e.g., video, audio, or similar output data) and/or a desired output parameter (e.g., light output intensity, light output direction, audio output volume, and similar). Each network connected output device may receive or generate location information that causes the respective device to autonomously travel to the designated location within a room or similarly defined or definable area. Such location information may be generated based upon input data received from one or more other sensors or similar data acquisition devices. For example, detected movement of a system user within a darkened room may cause a network connected output device that includes a luminaire moveably coupled to the ceiling of the room to track the system user as they move about the room and to provide an adequate level of luminous output, permitting the system user to safely navigate through the room. In another example, detected movement of a system user's head or eyes may cause an augmented reality network connected output device that includes a projector to project augmented reality data on physical objects falling within the user's line of sight.

The network connected output devices may include one or more Internet of Things (IoT) devices communicably coupled to a worldwide area network such as the Internet. Providing network connectivity provides computational load flexibility. In some instances, the network connected output device may perform the necessary data acquisition, signal processing, and computations to generate the information and/or data associated with both the movement of the device, the output content of the device, and/or one or more output parameters associated with the output content of the device. In other instances, the network connected output device may communicate the acquired data to a remote location (e.g., a cloud-based server) via the Internet and may receive information and/or data associated with both the movement of the device, the output content of the device, and/or one or more output parameters associated with the output content of the device from the remote location. The network connected output device may include a device capable of movement or motion in a two-dimensional (2-D) space, such as movement along a wall or ceiling. The network connected output device may include a device capable of movement in a three-dimensional (3-D) space, such as a drone capable of both horizontal (e.g., along x and y axes) and vertical (e.g., along a z-axis) movement or motion.

The network connected output device may include an autonomous device that includes an energy storage system that includes power distribution control circuitry and an energy storage device such as a primary (i.e., non-rechargeable) battery; secondary (i.e., rechargeable) battery; a super-capacitor; an ultra-capacitor; a fuel-cell; or similar technology. The network connected output device may include a device powered using a wireless energy transfer technology, such as an inductive energy transfer technology or a wireless energy transfer technology. The network connected output device may monitor the energy level in the energy storage device and may autonomously recharge or regenerate the energy storage device when the energy level in the energy storage device falls below a defined threshold.

The network connected output device may include an Internet of Things (IoT) capable device. The Internet of Things (IoT) may be described as a 'network of networks' where connected devices utilize various personal, local, regional, wide, and worldwide communications networks and technologies such as the Internet to communicate with remote devices. IoT capable devices may also use a local, logical, network of nearby IoT devices (called nodes). IoT devices may contain a variety of devices and systems including data acquisition devices (e.g., sensors), data processing circuitry (e.g., processors, control circuitrys, microcontrol circuitrys), and transceivers (e.g., IEEE 802.11, IEEE 802.3. IoT devices may include devices that are network-capable and remotely-controllable, such as output devices. Communication between IoT devices may be provided using a variety of communication standards, such as ZigBee, Bluetooth, Bluetooth Low Energy (BLE), Symphony, 6LoWPAN, Wireless Fidelity (WiFi) protocols utilizing an Institute for Electrical and Electronics Engineers (IEEE) 802.11 family of standards, including 802.11n, 802.11ac, 802.11ad, 802.11ah, and the like.

A moveable output device is provided. The moveable output device may include: a surface coupling assembly to physically attach the moveable output device to at least one of: a vertical surface or an inverted surface; a propulsion system to displace the moveable output device across at least one of: the vertical surface or the inverted surface; at least one environmental detection system to generate an environmental signal that includes environmental information; at least one biometric detection system to generate a biometric signal that includes biometric information; at least one output system; control circuitry; at least one non-transitory memory to store at least one machine-readable instruction set that when executed by the control circuitry, causes the control circuitry to: receive at least one of: the environmental signal or the biometric signal; and using at least one of the received biometric information or the received environmental information: generate a routing for the moveable output device across at least one of: the vertical surface or the inverted surface; and adjust one or more output parameters of the at least one output system.

An automated output method is provided. The method may include physically attaching a moveable output device to at least one of: a vertical surface that defines an area occupied by a subject or an inverted surface that defines the area occupied by the subject; receiving, by control circuitry in the mobile output device, an environmental signal that includes environmental information associated with the area, from an environmental detection system; receiving, by the control circuitry, a biometric signal that includes biometric information associated with the subject in the area, from a biometric detection system; generating, by the control circuitry, a routing for the moveable output device across at least one of: a vertical surface defining at least a portion of the area or an inverted surface defining at least a portion of the area, the routing generated based at least in part on at least one of the environmental signal or the biometric signal; and adjusting, by the control circuitry, one or more output parameters of at least one output system disposed in the mobile output device, the one or more output parameters adjusted based at least in part on at least one of the environmental signal or the biometric signal.

A non-transitory machine readable storage medium containing at least one instruction set is provided. The at least one instruction set, when executed, causes a control circuit disposed in a moveable output device physically attached to at least one of: a vertical surface that defines an area occupied by a subject or an inverted surface that defines the area occupied by the subject to: receive an environmental signal that includes environmental information associated with the area, from an environmental detection system; receive a biometric signal that includes biometric information associated with the subject in the area, from a biometric detection system; generate a routing for the moveable output device across at least one of: a vertical surface defining at least a portion of the area or an inverted surface defining at least a portion of the area, the routing generated based at least in part on at least one of the environmental signal or the biometric signal; and adjust one or more output parameters of at least one output system disposed in the mobile output device, the one or more output parameters adjusted based at least in part on at least one of the environmental signal or the biometric signal.

An automated output system is provided. The automated output system may include: a means for physically attaching a moveable output device to at least one of: a vertical surface that defines an area occupied by a subject or an inverted surface that defines the area occupied by the subject; a means for receiving an environmental signal that includes environmental information associated with the area; a means for receiving a biometric signal that includes biometric information associated with the subject in the area; a means for generating a routing for the moveable output device across at least one of: a vertical surface defining at least a portion of the area or an inverted surface defining at least a portion of the area, the routing generated based at least in part on at least one of the environmental signal or the biometric signal; and a means for adjusting one or more output parameters of at least one output system disposed in the mobile output device, the one or more output parameters adjusted based at least in part on at least one of the environmental signal or the biometric signal.

FIG. 1 depicts an illustrative system in which a plurality of output devices 110A-110n detect the movement, motion, or displacement parameters of a subject 130 and autonomously move in, through, or across a two- or three-dimensional space based upon the received movement, motion, or displacement parameters of a subject 130, in accordance with at least one embodiment described herein. As depicted in FIG. 1, at least some of the output devices 110 detect movement or other biometric parameters associated with the subject 130, and responsive to the movement and/or biometric parameters, perform one or more actions.

For example, if the subject 130 is moving across an area, a first output device 110A may illuminate the area immediately in front of the subject 130 to improve visibility and permit the subject 130 to safely traverse the area. Using the same example, a second output device 110B may project augmented reality information and/or data on physical objects within the area to provide information to the subject 130. Again, using the same example, a third output device 110C may project a virtual input device on a surface within the area to permit the subject 130 to interact with one or more remote resources, such as one or more servers 190. Importantly, each of the output devices 110A, 110B, and 110C may all autonomously track the subject 130 and provide illumination (110A), augmented reality information and/or data (110B), and/or virtual input devices (110C) proximate the subject 130 and without requiring an input from the subject 130. In embodiments, the subject 130 may be a human being, an animal, an automated system, or a processor based device coupled to a moveable object such as a human being or an animal.

In embodiments, at least some of the output devices 110 may communicate 124 via a wired or wireless network 126 with one or more other output devices 110. In embodiments, at least some of the output devices 110 may communicate 124 via the wired or wireless network 126 with one or more remote resources, for example one or more cloud based servers 190. Such communication with remote resources may be implemented as a local area network 126 communicably coupling the output devices 110 to an Internet of Things (IoT) gateway 150 and a worldwide network 170 communicably coupling the IoT gateway 150 to the remote resource (i.e., server 190). Such an arrangement permits the output device 110 to access significantly more information and/or data than could ordinarily be stored in one or more storage devices carried by the output device 110.

In embodiments, each of the output devices 110A-110n (collectively, "output devices 110") may include: a respective sensor or sensor array 112A-112n (collectively, "sensors 112"), a respective propulsion system 114A-114n (collectively, "propulsion systems 114"), a respective transceiver 116A-116n (collectively, "transceiver 116"), one or more respective output systems 118A-118n (collectively, "output systems 118"), and one or more control circuitrys 122A-122n (collectively "control circuitrys 122"). Additionally, at least some of the output devices 110 may also include an energy storage system 120A-120n (collectively, "energy storage system 120"). The propulsion system 114 moves the output device 110 in response to an action taken by the subject 130. For example, the propulsion system 114 may cause an output device 110 to follow or track the movement of the subject 130. In embodiments, the propulsion system 114 may move or otherwise displace the output device 110 in a two-dimensional (2-D) space where location may be described using an x-coordinate and a y-coordinate, such as a wall, floor, or ceiling. In some implementations, the propulsion system 114 may move or otherwise displace the output device 110 in a three-dimensional (3-D) space where location may be described using an x-coordinate, a y-coordinate, and a z-coordinate.

The sensors 112 may include any number and/or combination of environmental sensors and/or environmental sensor arrays that form all or a portion of an environmental detection system. The environmental sensors 112 included in the environmental detection system may assist in the movement of the output device 110. For example, at least some of the environmental sensors 112 may detect edges, boundaries, obstructions, and other impediments and non-traversable obstructions within an area or region or along a proposed direction of travel of the output device 110. At least some of the environmental sensors 112 may include sensors capable of detecting ambient conditions in the area proximate the subject 130. For example, at least some of the environmental sensors 112 may detect objects, events (fire, smoke, running water, carbon monoxide, other gases, radiation, etc.), and/or ambient conditions (temperature, pressure, humidity, subject 130 location, etc.). In embodiments, the output device 110 may communicate, via transceiver 118, the information and/or data obtained using the environmental sensors 112 to another output device 110 and/or to a remote resource 190.

The sensors 112 may additionally or alternatively include any number and/or combination of biometric sensors and/or biometric sensor arrays that form all or a portion of a biometric detection system. At least some of the biometric sensors 112 may detect and generate one or more output signals that include information and/or data represented of detected movement, motion, gestures, facial expressions, and similar actions, movements, and/or communication by the subject 130. In embodiments, the output device 110 may communicate, via transceiver 118, the information and/or data obtained using the biometric sensors 112 to another output device 110 and/or to a remote resource 190.

For example, if a first output device 110A in a first room tracks a subject 130 moving through a doorway to a second room, the first output device 110A may communicate information and/or data indicative of the movement of the subject 130 to the second room to a second output device 110B in the second room. In response to receiving the information and/or data, the second output device 110B may position itself proximate the doorway through which the subject 130 will pass. In another example, a first output device 110A may detect a fire or other hazardous situation in a first location in a building and may broadcast a signal that includes information and/or data indicative of the detected hazardous situation to at least some of the remaining output devices 110, causing the remaining output devices to alert people elsewhere in the building to the hazardous situation and causing the remaining output devices 110 to project arrows on the floor to lead the people away from the hazardous situation and out of the building. In yet another example, the subject 130 may be traversing an area filled with hazards (pits, steep drop-offs, etc.). The output device 110 may communicate information and/or data indicative of the location of the subject 130 to a remote resource 190 such as a cloud-based server that includes a database, data store, or data structure containing information indicative of the location of the hazards in the direction of travel of the subject 130. The remote resource 190 may communicate the hazard location information to the output device 110. Responsive to receipt of the hazard location information from the remote resource 190, the output device 110 may illuminate or otherwise identify the hazard prior to the subject 130 arriving at the location of the hazard.

Thus, sensors 112 may include any currently available or future developed devices, systems, or combinations thereof capable of generating or otherwise acquiring information and/or data associated with the subject 130, the output device 110, and/or the environment proximate the subject 130 and/or the output device 110. The sensors 112 may include any number and/or combination of biometric and/or environmental sensors. Example biometric and environmental sensors 112 may include, but are not limited to: geolocation sensors, 2-D imaging sensors, 3-D imaging sensors, thermal imaging sensors, acoustic sensors, RADAR sensors, LIDAR sensors, SONAR sensors, ultrasonic sensors, temperature sensors, pressure sensors, humidity sensors, accelerometer sensors, gyroscopic sensors, RF detection sensors, microwave detection sensors, gas detection sensors, visible light cameras, infrared cameras, ultraviolet cameras, and similar.

The propulsion system 114 generates an output capable of moving the output device 110 in a 2-D space or a 3-D space. In embodiments, the propulsion system 114 includes a motor operably coupled to a final drive element. Power for the motor may be supplied from the energy storage system 120 carried by the output device 110 or from one or more external sources. Where power is provided by one or more external sources, the output device 110 may be wirelessly coupled to the power supply (e.g., inductive charging) or tethered to the power supply. The final drive element powered by the motor may be selected based upon the proposed service conditions for the output device 110. For example, where the output device 110 will traverse a 2-D surface, such as a wall or ceiling that is covered with a magnetic material, the final drive element may include a magnetic wheel that attaches the output device 110 to the respective wall or ceiling using a magnetic attraction force. In another example, where the output device 110 will traverse a 3-D space (e.g., where the output device is a "drone"), the final drive element may include a propeller, rotor or similar airfoil.

The propulsion system 114 may include one or more passive or active directional control systems. In embodiments, the directional control system may include one or more steerable or rotatable elements capable of altering the direction of travel of the output device 110 on a 2-D surface. In embodiments, the directional control system may include adjustable ailerons, longerons, flaps, rudders, or similar control surfaces. In embodiments, the directional control system may include adjustable speed controls and/or variable pitch propellers, rotors, or similar airfoils.

The transceiver 116 may include any communication device capable of providing wireless communications between the output device 110 and at least one other output device 110 and/or one or more gateways 150. The transceiver 116 may communicate, via network 126, with other output devices 110 and/or one or more gateways 150 using any communications protocol. Example communications protocols include, but are not limited to, ZigBee®, Bluetooth®, Bluetooth Low Energy (BLE)®, Symphony®, 6LoWPAN, Wireless Fidelity (WiFi) protocols utilizing an Institute for Electrical and Electronics Engineers (IEEE) 802.11 family of standards, including 802.11n, 802.11ac, 802.11ad, 802.11ah, and the like. The transceiver 116 may receive power from the energy storage system 120 carried by the output device 110. The transceiver 116 may communicate with at least one other output device 110 on a continuous, intermittent, periodic, aperiodic, or event-driven basis. The transceiver 116 may communicate with the gateway 150 on a continuous, intermittent, periodic, aperiodic, or event-driven basis.

The output system 118 may include any type of human perceptible output. In some embodiments, the output system 118 may include one or more luminaires. The one or more luminaires may include one or more currently available or future developed devices capable of producing an electromagnetic output in at least a portion of the visible spectrum. Example luminaires include, but are not limited to, one or more light emitting diode luminaires, one or more halogen luminaires, one or more fluorescent luminaires, and/or one or more incandescent luminaires. In some embodiments, the output system 118 may include one or more currently available or future developed projection devices capable of projecting an image in the form of an electromagnetic output in at least a portion of the visible spectrum. Example projection devices include, but are not limited to, a digital light processing (DLP) projector, a liquid crystal display (LCD) projector, or a light emitting diode LED projector. In some implementations, the output system 118 may include a projection device capable of producing a virtual input device (e.g., virtual keyboard and/or virtual pointing device) that permits the subject 130 to provide input to the output device 110. In some implementations, the output system 118 may additionally or alternatively include an audio output system capable of delivering an audio output to the subject 130.

The energy storage system 120 may include any type, combination, and number of devices and/or systems for storing and releasing energy in a controlled manner. The energy storage system 120 may include power distribution control circuitry that includes one or more power monitors, power regulators, or similar devices or systems to monitor the delivery of power to the various systems and devices carried by the output device 110. In some implementations, the energy storage system 120 may include one or more wireless (e.g., inductive) power transfer devices to power the output device 110 and/or to charge or otherwise replenish the energy storage device 120. In some implementations, the energy storage device 120 may include one or more conversion devices. Example, non-limiting conversion devices include alternating current (AC) to direct current (DC) converters, DC to AC converters, DC to pulse width modulation (PWM) converters, and similar.

In some implementations, the energy storage system 120 may include one or more primary (i.e., non-rechargeable) batteries or one or more secondary (i.e., rechargeable) batteries. Example rechargeable batteries include, but are not limited to: aluminum-ion batteries, lithium-air batteries, lithium-ion batteries, magnesium-ion batteries, nickel-cadmium (NiCad) batteries, nickel-metal hydride batteries, and similar. In some implementations, the energy storage system 120 may include one or more supercapacitors or ultracapacitors.

The control circuitry 122 may include any type, combination, and number of circuits, systems, logic elements, electrical components, and semiconductor devices to control the operation of the output device 110. The control circuitry 122 may provide signal processing for the signals provided by the one or more environmental and/or biometric sensors 112 carried by the output device 110. The control circuitry 122 may provide instructions and/or commands to the propulsion system 114 to alter, control, or adjust the power output of the propulsion system 114 and/or to control the direction of travel of the output device 110. The control circuitry 122 may provide one or more signals to the transceiver 116 for communication to at least one other output device 110 and/or to the gateway 150. The control circuitry 122 may alter, control, or adjust the operation of the output system 118. The control circuitry 122 may alter, control, or adjust one or more parameters of the output provided by the output system 118. For example, the control circuitry 122 may generate the virtual input device for display by the output system 118 and may receive the input from the subject 130 via the virtual input system. In some implementations, the control circuitry 122 may determine routing instructions for the output device 110. Such routing instructions may be based on environmental and/or biometric information and/or data obtained by the sensors 112, locally stored information and/or data representative of the position of the output device 110 within a defined area or region, remotely stored information and/or data representative of the position of the output device 110, or any combination thereof.

Each of the output devices 110 may unidirectionally or bidirectionally communicate with the gateway 150. At least some of the output devices 110 may unidirectionally or bidirectionally communicate with at least one other output device 110. In some implementations, at least some of the output devices 110 may generate a broadcast message that is receivable by at least some of the other output devices 110. In some implementations, at least some of the output devices 110 may communicate identification and/or address information to at least some of the other output devices 110. In such implementations, the output devices 110 may exchange capability information that may include number and type of sensors carried by the respective output device 110, a location of the respective output device 110, limitations on the positioning or location of the respective output device 110, or combinations thereof. Exchanging such information makes it possible for a control circuitry 122 to select an appropriate output device 110 to perform a specific function.

For example, a first output device 110A may be equipped with a visible image acquisition device (e.g., a camera) 112A and a second output device 110B may be equipped with a thermal image acquisition device (e.g., a near-IR camera) 112B. The first output device 110A may detect the presence of smoke which obscures the image obtained with a conventional camera 112A. To determine whether a fire is present, the first output device 110A may send an addressed message to the second output device 110B to obtain an image of the area using the thermal imaging camera 112B. The thermal imaging camera 112B may detect a fire, in which case the display systems 118 carried by either (or both) the first output device 110A and the second output device 110B may generate output showing subjects 130 present in the area a safe path for escape.

The output devices 110 communicate with each other and/or the gateway 150 via one or more networks 126. The one or more networks 126 may include one or more personal area networks (PANs); one or more local area networks (LANs); one or more wireless local area networks (WLANs); one or more metropolitan area networks (MANs); or any combination thereof. The output devices 110 may communicate using any currently available or future developed, industry standard or proprietary communications protocol.

The subject 130 may include an animate (e.g., human, animal) object or an inanimate object (e.g., autonomous vehicle, processor-based device carried by a human or animal). Where the subject 130 is a human, the sensors 112 may obtain biometric information and/or data such as posture, pose, arm gestures, arm position, hand gestures, hand position, facial expression, facial characteristics, head position, or combinations thereof. The control circuitry 122 may use such biometric information and/or data to determine whether to cause the output system 118 to generate output, to select the type of output (video, audio, both, etc.), and/or to select the content of the output (informational, warning, directions, augmented reality information, etc.). The control circuitry 122 may assess the information collected by the environmental and biometric sensors 112 to determine a location of the subject 130 and/or a direction of travel of the subject 130. In embodiments, using direction of travel information, the control circuitry may cause the output device 110 to illuminate the area immediately in front of the subject 130 permitting the subject 130 to identify potential hazards along the path of travel. In other embodiments, using the head position of the subject 130 and objects identified as falling within the view of the subject 130, the control circuitry may cause the output system 118 to display/project augmented reality information and/or data directly on the objects or proximate each object. In yet other embodiments, when the subject 130 is proximate an identified table or desk and the subject's head position indicates the subject 130 is looking at the table or desk, the control circuitry 122 may cause the display system 118 to generate and display a virtual data entry device on the surface of the table or desk.

The gateway 150 may include any combination of devices and/or systems capable of bridging between the output devices 110 and one or more remote resources 190. In some implementations, the gateway 150 may include an Internet of Things (IoT) gateway 150. In some implementations, the gateway 150 may include a switch or router communicably coupled to a worldwide network 170 such as the Internet. The remote resource 190 may include one or more processing devices, one or more storage devices, or any combination thereof.

Figure 2:
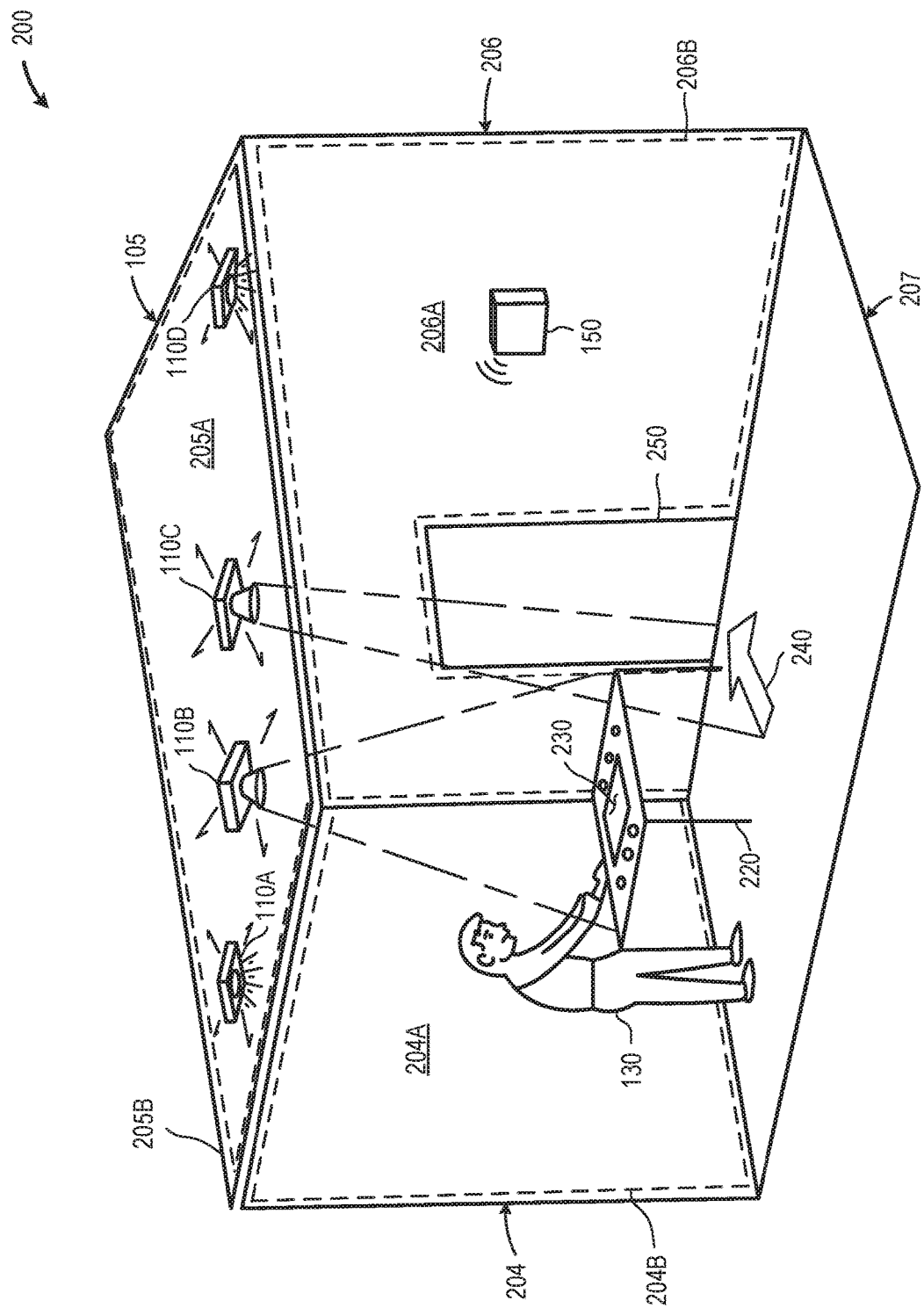
FIG. 2 is a perspective view of an illustrative system that includes four output devices disposed in an environment that includes walls, a ceiling, and a floor, and in which two of the output devices include autonomously moveable luminaires and two of the output devices include projection devices, in accordance with at least one embodiment described herein.

FIG. 2 is a perspective view of an illustrative system 200 that includes four output devices 110A-110D disposed in an environment that includes walls 204, 206, a ceiling 205, and a floor 207, and in which two of the output devices 110A and 110D include autonomously moveable luminaires and two of the output devices 110B and 110C include projection devices, in accordance with at least one embodiment described herein. As depicted in FIG. 2, the output devices 110 communicably coupled to the gateway 150. The subject 130 is standing by a table 220 on which output device 110B projects a virtual input device 230. Output device 110C projects an arrow 240 indicating the direction to doorway 250 on the floor 207. As depicted in FIG. 2, output devices 110A and 110D include luminaires used to illuminate the area proximate the subject 130 (output device 110A) and to illuminate the area adjacent to doorway 250 (output device 110B).

In embodiments, the output devices 110 may include one or more magnetic devices that physically couple the output devices 110 to the ceiling 205 via magnetic attraction. In such embodiments, the ceiling may include a magnetic material 205A may be disposed in, on, or about the ceiling 205 within a designated area identified by border 205B. A magnetic material 204A may be disposed in, on, or about wall 204, permitting output devices 110 to move about on wall 204 within the designated area identified by border 204B. A magnetic material 206A may be disposed in, on, or about wall 206, permitting output devices 110 to move about on wall 206 within the designated area identified by border 206B. In some implementations, the output device 110 may include a propulsion system 114 having a final drive element that includes a drive wheel with embedded magnets (see FIGS. 6A and 6B for additional details). The magnetic attraction between the final drive element and the magnetic material disposed in, on, or about the walls 204, 206 and ceiling 205 is sufficient to maintain the output device in contact with the respective walls 204, 206 and/or ceiling 205.

Figure 3:
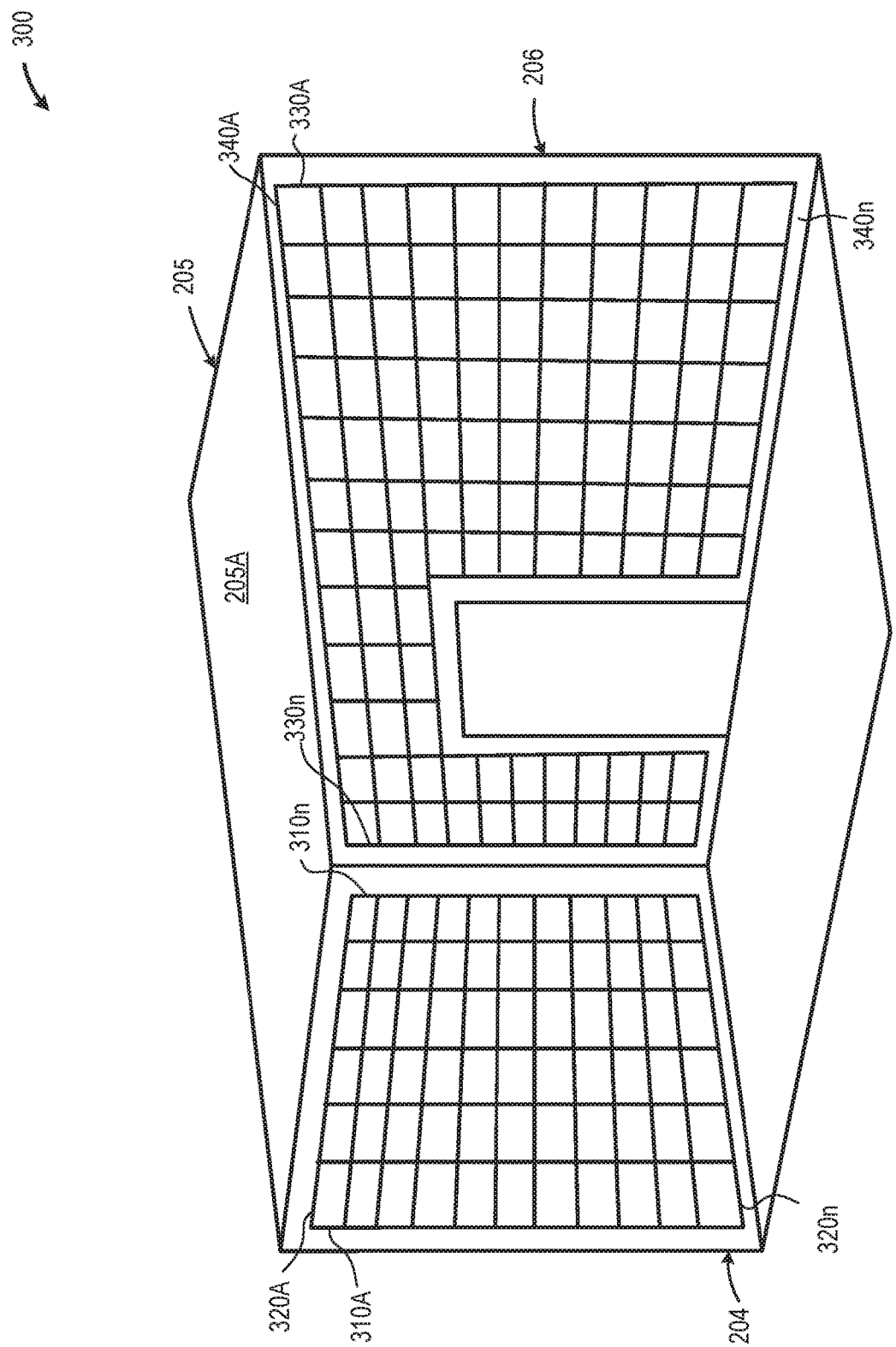
FIG. 3 is a perspective view depicting an alternative system in which a magnetic grid system that includes a plurality of vertical runners and a plurality of horizontal runners disposed in, on, or about wall and a plurality of vertical runners and a plurality of horizontal runners disposed in, on, or about wall, in accordance with at least one embodiment described herein.
Figure 4:
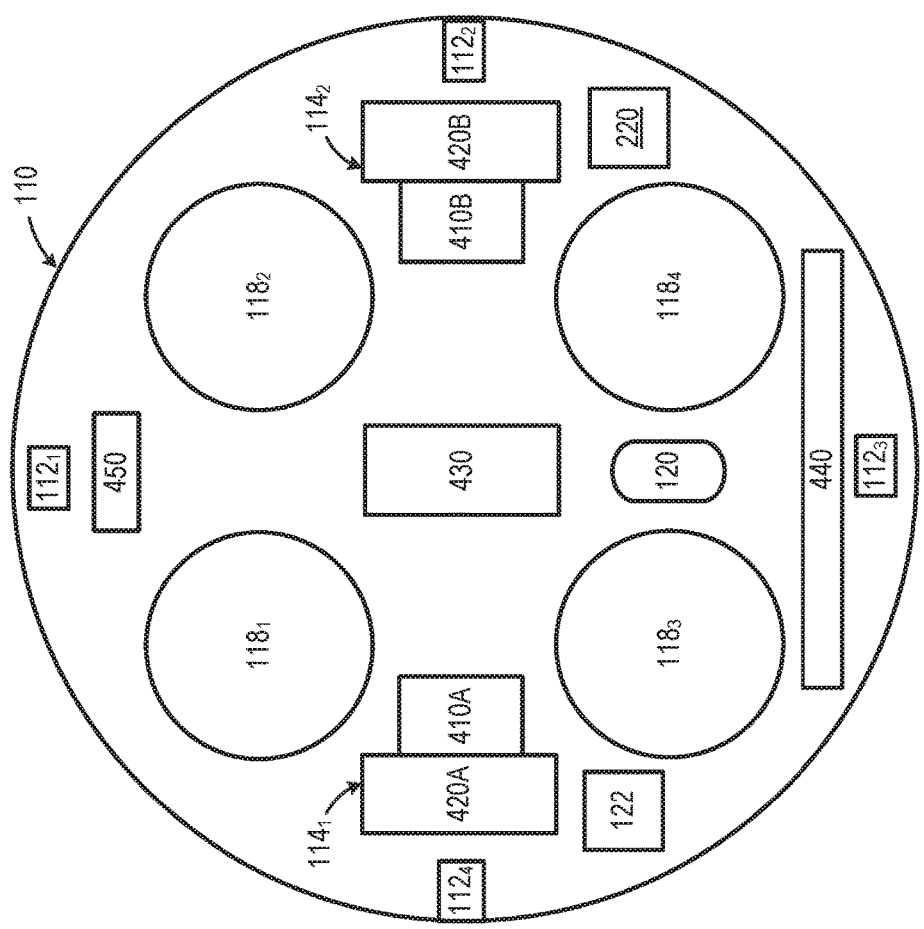
FIG. 4 is a schematic of an illustrative output device that includes: four sensors; two propulsion systems; a transceiver; four output systems; an energy storage system; and a control circuitry, in accordance with at least one embodiment described herein.

FIG. 3 is a perspective view depicting an alternative system 300 in which a magnetic grid system that includes a plurality of vertical runners 310A-310$n$ and a plurality of horizontal runners 320A-320$n$ disposed in, on, or about wall 204 and a plurality of vertical runners 330A-330$n$ and a plurality of horizontal runners 340A-340$n$ disposed in, on, or about wall 206, in accordance with at least one embodiment described herein. Note that a similar grid arrangement using magnetic runners may be disposed in, on, or about ceiling 205, however is not shown in FIG. 3 for clarity. In such embodiments, the output devices 110 may include devices and/or systems that enable the output device 110 to locate, track, and/or follow the horizontal and vertical runners to traverse the walls 204, 206 and ceiling 205. FIG. 4 is a schematic of an illustrative output device 110 that includes: four sensors $112_1$-$112_4$; two propulsion systems $114_1$, $114_2$; a transceiver 116; four output systems $118_1$-

$118_4$; an energy storage system 120; and a control circuitry 122, in accordance with at least one embodiment described herein. In addition to the above listed components, the illustrative output device 110 also includes a separate magnetic wheel assembly 430 to magnetically couple the output device 110 to a wall 204, 206 or ceiling 205. Further, the illustrative output device 110 additionally includes one or more biometric sensors 440 and one or more short range transceivers 450. Although a plurality of position sensors 112, propulsion systems 114, and output systems 118 are depicted in FIG. 4, one of ordinary skill in the relevant arts will readily appreciate that a greater or lesser number of such components may be used in an output device 110 based upon the expected service and expected service conditions.

The output device 110 includes an environmental detection system that includes four environmental sensors 112 used to determine the location or position of the output device 110 within an operating environment. In some implementations, such sensors may provide location information and/or data using local landmarks to the control circuitry 122. For example, the four environmental sensors 112 may include laser or ultrasonic distance sensors, in which case, the environmental sensors 112 would provide the control circuitry with location information based on the distance to the walls, ceiling, and floor of the operating environment. In some implementations, such environmental sensors 112 may provide absolute or geolocation information and/or data using longitude, latitude, and elevation data obtained from a global positioning system (GPS, GLONASS, etc.). For example, the environmental sensors 112 may provide the control circuitry 122 with location information based on an absolute coordinate system, such as longitude, latitude, and elevation. In other implementations, such environmental sensors 112 may provide relative location information and/or data obtained via triangulation, radio frequency fingerprinting, or other technique based on locally available and uniquely identifiable RF signatures (wireless networks/WiFi, cellular signals, etc.). The environmental sensors 112 may provide such location information and/or data to the control circuitry 122 on a continuous, intermittent, periodic, aperiodic, or event-driven basis.

In embodiments, the output device 110 may include one or more IEEE 1451 (Latest Version—"Smart Transducer Interface Standards") compliant communication interfaces to permit the selective plug-and-play coupling of additional or replacement environmental and/or biometric sensors 112 to the output device 110. In embodiments, although not depicted in FIG. 4, the output device 110 may include one or more sockets or similar interface attachment features that permit the selective coupling/decoupling of sensors 112.

The output device 110 includes a plurality of propulsion systems $114_1$ and $114_2$ to move or displace the output device within a region or area. As depicted in FIG. 4, each of propulsion systems $114_1$ and $114_2$ includes a respective driver 410A, 410B (collectively, "drivers 410") operably coupled to a respective final drive element 420A, 420B (collectively, "final drive elements 420"). As depicted in FIG. 4, the drivers 410 include electric motors 410A and 410B and the final drive elements 420 include rotatable drive wheels 420A and 420B that are operably coupled to electric motors 410A and 410B, respectively. Although the final drive elements 420 are depicted in FIG. 4 as wheels, the final drive elements 420 may include any number or combination of elements capable of causing ha physical displacement of the output device 110 in a 2-D or 3-D environment. Example final drive elements include, but are not limited to: caterpillar treads, propellers, rotors, and the like.

The output device 110 includes one or more transceivers 116 to unidirectionally or bidirectionally communicate with a gateway device 150. In some implementations, the one or more transceivers 116 may unidirectionally or bidirectionally communicate with one or more other output devices 110, thereby providing the capability of cooperative or collaborative functionality using a plurality of output devices 110. In embodiments, the transceiver 116 may include one or more wireless communication interfaces using any currently available or future developed industry standard protocol. Such protocols may include, but are not limited to: IPv4; IPv6; 6LoPAN; IEEE 802.15.4 (Latest Version—ZigBee); Bluetooth®; Bluetooth Low Energy (BLE); ISO/IEC 18092:2004 (Latest Version—Near Field Communication, NFC); and ISA100.11a (Latest Version—"Wireless Systems for Industrial Automation: Process Control and Related Application").

The output device 110 includes a plurality of output systems $118_1$-$118_4$ to selectively provide an electromagnetic, acoustic, or similar output. As depicted in FIG. 4, a total of four (4) output systems $118_1$-$118_4$ are included in the output device. In embodiments, a greater or lesser number of output systems 118 may be disposed in, on, or about the output device 110. In output devices 110 that include a plurality of output systems 118, the output systems 118 may be the same or different. For example, the four output systems $118_1$-$118_4$ depicted in FIG. 4 include identical visible light producing devices, such as four LED luminaires. For example, in one embodiment, the output systems 118 may include one or more visible light producing luminaires, one or more audio output devices, and one or more near infrared (NIR) illuminators. Such an arrangement may be beneficial, for example, in a security application where one or more sensors 112 include a visible and NIR-sensitive imaging device. Such a system may be used to monitor an area using visible and NIR imaging, respond to a detected potential threat by moving to an area near the threat, illuminating the area with the visible light producing luminaire and providing an audio warning that the area is under surveillance with the audio output device. Other combinations of sensors 112 and/or output systems 118 may be used to provide application specific or targeted solutions.

The output device 110 includes at least one energy storage system 120 to distribute power to the sensors 112, the propulsion systems 114, the transceiver 116, the output device 118, and other onboard service and support systems. In embodiments, the energy storage system 120 may include one or more energy storage devices 460 operably coupled to power distribution control circuitry 470. In embodiments, the control circuitry 122 may provide all or a portion of the power distribution control circuitry 470. The one or more energy storage devices 460 may include any number and/or combination of currently available or future developed energy storage device such as primary batteries, secondary batteries, fuel cells, and the like. The power control circuitry 470 may include circuitry to convert power received from an external power supply or power grid to a form suitable for charging the energy storage devices 460. The power control circuitry 470 may allocate or distribute power from the one or more energy storage devices 460 to the various components carried by the output device 110. In some implementations, the power control circuitry 470 may include inductive power transfer circuitry to inductively receive power from an external inductive charging source. Such inductive power transfer circuitry may provide power to charge or restore the one or more energy storage devices. Such inductive power transfer circuitry may provide all or a portion of the operating power consumed by the output device 110.

The control circuitry 122 includes any number and/or combination of systems and/or devices capable of selectively controlling the operation of the sensors 112, the propulsion systems 114, the transceivers 116, the output systems 118, and the energy storage system 120. The control circuitry 122 may include any number and/or combination of hard-wired circuitry, programmable logic devices, electrical components, semiconductor devices, logic elements, and similar. The control circuitry 122 may include, but is not limited to, an application specific integrated circuits (ASIC); a reduced instruction set computer (RISC); a system-on-a-chip (SoC); a programmable gate array (PGA); a single- or multi-core processor or microprocessor; a digital signal processor (DSP); a programmable logic control circuitry (PLC); or combinations thereof. In some implementations, the control circuitry 122 may execute one or more machine-executable instruction sets that provide at least some of: sensor 112 functionality and signal processing; propulsion system 114 speed, direction, and course; transceiver 116 communication with gateway 150 and with other output devices 110; output system 118 operation and operating parameters; and energy storage system 120 charging, power distribution, and energy conservation.

In embodiments, the control circuitry 122 may cause the output device 110 to track or follow a subject 130 based on the information and/or data using one or more sensors 112. For example, the control circuitry 122 may use information and/or data provided by one or more sensors 112 to determine a location and direction of travel of a subject 130. In response to determining the location and direction of travel of the subject 130, the control circuitry 122 may cause an output device 110 that includes one or more luminaire output systems 118 to illuminate the predicted pathway ahead of the subject 130. In another implementation, the control circuitry 122 may receive, from a gateway 150, information and/or data associated with a destination (a hotel room, seat in a restaurant, seat in a theatre, etc.). The control circuitry 122 may cause the movement of the output device 110 in conjunction with the movement of the subject and may additionally cause a projector output system 118 to display an arrow on the floor ahead of the subject 130 to direct the subject 130 to the desired destination.

In embodiments, the control circuitry 122 may predict the path or course of a subject 130. In response, the control circuitry 122 may cause the output device 110 to pre-position to a location along the predicted path or course of the subject 130. Such a pre-positioning of the output device 110 enables the control circuitry 122 to illuminate the path or provide guidance or other information and/or data to the subject 130. For example, the control circuitry 122 may predict the path of a subject 130 through a museum or similar locale filled with objects or artifacts. In response, the control circuitry 122 may cause the output device 110 to pre-position proximate a display object or artifact and may additionally cause a projector output system 118 to display information and/or data associated with the object or artifact in a location visible to the subject 130.

In addition to selectively controlling the operation of the environmental and/or biometric sensors 112, the control circuitry 122 may control one or more operational parameters of the sensors 112. For example, the control circuitry 122 may control the sampling duration and/or frequency for each sensor 112. The control circuitry 122 may selectively turn environmental and/or biometric sensors 112 ON and OFF or may place sensors 112 into a STANDBY mode. For example, the control circuitry 122 may turn an environmental sensor 112 such as an infrared imaging device ON at dusk and OFF at dawn. In some implementations, the control circuitry 122 may cause a relatively low power sensor 112A to remain continuously ON and may selectively toggle a relatively high power sensor 112B ON and OFF based upon the first sensor 112 detecting an event (turns sensor 112B ON) and detecting the conclusion of the event (turns sensor 112B OFF).

In addition to selectively controlling the operation of the output system 118, the control circuitry 122 may control one or more operational parameters of the output system 118. For example, where the output system 118 is a visible light luminaire, the control circuitry 122 may control the color/temperature, intensity, duration, and/or direction of the luminous output. In another example, where the output system 118 is an audio output device, the control circuitry 122 may control the volume and/or frequency response range of the audio output device.

In embodiments, the control, circuitry 122 may include or may be communicably coupled to one or more storage devices. Such storage devices may include a volatile memory such as a random access memory (RAM) or dynamic random access memory (DRAM). Such volatile memory may be used to store information and/or data collected by the sensors 112, routing information and/or data used by the control circuitry 122 in moving the output device 110 on a defined course or pathway, and similar. Such storage devices may include one or more non-volatile memories such as read-only memory (ROM), an erasable programmable read only memory (EPROM), or an electrically erasable programmable read only memory (EEPROM). Such non-volatile memory may be used to store basic input/output system (BIOS) information, an operating system, and similar data used by the control circuitry 122 to initialize, operate, and control the output device 110.

The output device 110 also includes a magnetic wheel assembly 430. The magnetic wheel assembly 430 includes a plurality of magnets disposed in, on, or about a rotatable member. The magnetic wheel assembly 430 couples the output device 110 to a magnetic surface disposed in, on, or about a wall, ceiling, or floor. In embodiments, at least some the plurality of magnets included in the magnetic wheel assembly 430 may include conventional steel or iron magnets. In other embodiments, at least some of the plurality of magnets included in the magnetic wheel assembly 430 may include rare earth magnets, such as a neodymium magnet. In other embodiments, at least some of the plurality of magnets included in the magnetic wheel assembly 430 may include one or more electromagnets that receive electrical power from the at least one energy storage system 120.

The output device 110 may include a biometric detection system that includes one or more biometric sensors 440 capable of detecting one or more biometric parameters of the subject 130. In some implementations, the one or more biometric sensors 440 may directly obtain such biometric information and/or data. In other implementations, the one or more biometric sensors 440 may indirectly obtain such biometric information and/or data. For example, the one or more biometric sensors 440 may wirelessly obtain such information from a wearable device such as a smartwatch and/or smart eyewear. In yet other implementations, the one or more biometric sensors 440 may obtain such information from a portable device carried by the subject 130. For example, a smartphone or similar processor-based device carried by a human subject 130 and/or a collar worn by an animal subject 130.

In some implementations, the one or more biometric sensors 440 may capture facial expressions, eye movements, and/or facial structure. The one or more biometric sensors 440 may provide, to the control circuitry 122, one or more signals that include acquired information and/or data. In at least some implementations, the one or more biometric sensors 440 may include REALSENSE® technology as offered by Intel® Corp. (SANTA CLARA, Calif.). Such technology facilitates depth perception, 3-D imaging, interior mapping and feature tracking by the control circuitry 122. In embodiments, the one or more biometric sensors 440 may track the eye movements of the subject 130. Using information and/or data associated with eye movements, the control circuitry 122 may cause a projector output system 118 to generate an augmented reality (AR) output by continuously adjusting projection content and projection angle based, at least in part, on the subject's eye movement and/or the angle of the projection surface. In some implementations, multiple biometric sensors 440 may be used to obtain biometric information and/or data from the subject 130.

The output device 110 beneficially and advantageously tracks the subject 130 while generating output using the output system 118 thereby permitting the generation of AR data on a variety of surfaces in the home and/or office without the need for the subject 130 to wear an AR display device. As used herein, the terms "augmented reality" and "AR" refer to a live direct or indirect view of a physical, real-world environment in which various objects or elements are augmented (or supplemented) with computer-generated sensory input such as sound, video, graphics, or GPS data. Furthermore, the cooperative nature of the output devices 110 may permit, in some circumstances, generation of AR information using a plurality of output devices 110, beneficially permitting an AR projection on larger surfaces than would be possible using a single AR projector.

The output device 110 may include one or more short range transceivers 450 capable of unidirectional or bidirectional communication with one or more wearable or portable devices carried and/or worn by the subject 130. Such wearable devices may include, but are not limited to: a smartwatch, an AR-enabled eyewear, a smartphone, or combinations thereof. In one embodiment, the wearable device may include REMOTE EYESIGHT® AR-enabled eyeglasses as offered by Intel® Corp. (SANTA CLARA, Calif.) or HOLOLENS® AR-enabled eyeglasses as offered by Microsoft® Corp. (REDMOND, Wash.). In some embodiments, the output device 110 may simultaneously track the movement and/or eye movement of the subject 130 using REALSENSE®, or similar technology, while simultaneously sending a HOLOLENS® signal to eyewear worn by the subject 130.

Figure 5B:
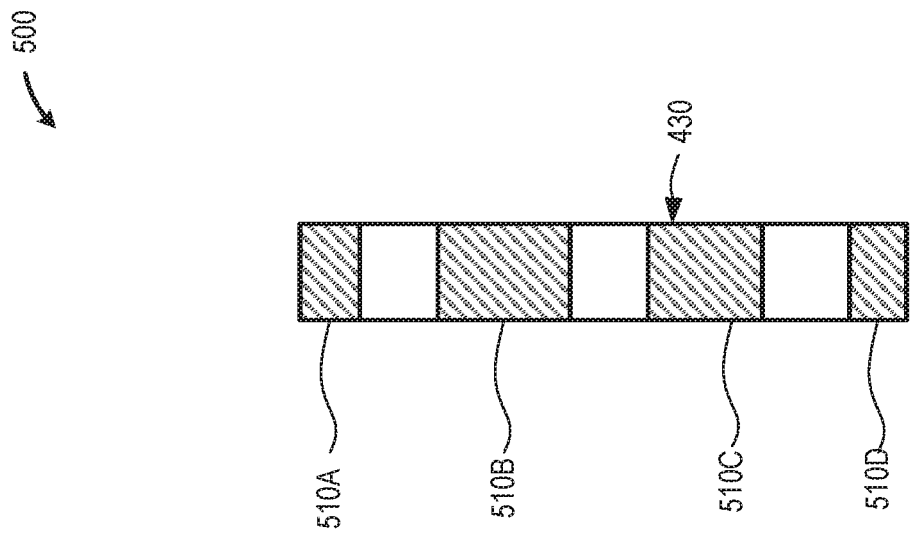
FIG. 5B is a front elevation of the illustrative magnetic wheel assembly depicted in FIG. 5A, in accordance with at least one embodiment described herein.
Figure 5A:
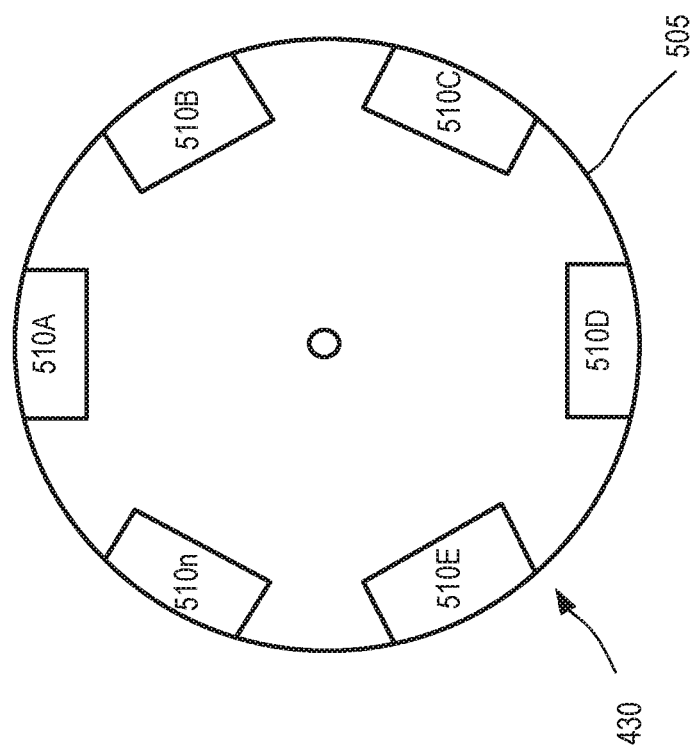
FIG. 5A is a side elevation of an illustrative magnetic wheel assembly, in accordance with at least one embodiment described herein.

FIG. 5A is a side elevation of an illustrative magnetic wheel assembly 430, in accordance with at least one embodiment described herein. FIG. 5B is a front elevation of the illustrative magnetic wheel assembly 430 depicted in FIG. 5A, in accordance with at least one embodiment described herein. A depicted in FIGS. 5A and 5B, the magnetic wheel assembly may include a plurality of magnets 510A-510n disposed about the periphery of the magnetic wheel assembly 430. In some implementations, the magnetic wheel assembly 430 may include a ring magnet or similar, single, continuous magnetic element disposed about the perimeter of the magnetic wheel assembly 430. In embodiments, the magnetic wheel assembly 430 rotates about a axle or similar shaft member.

Figure 6:
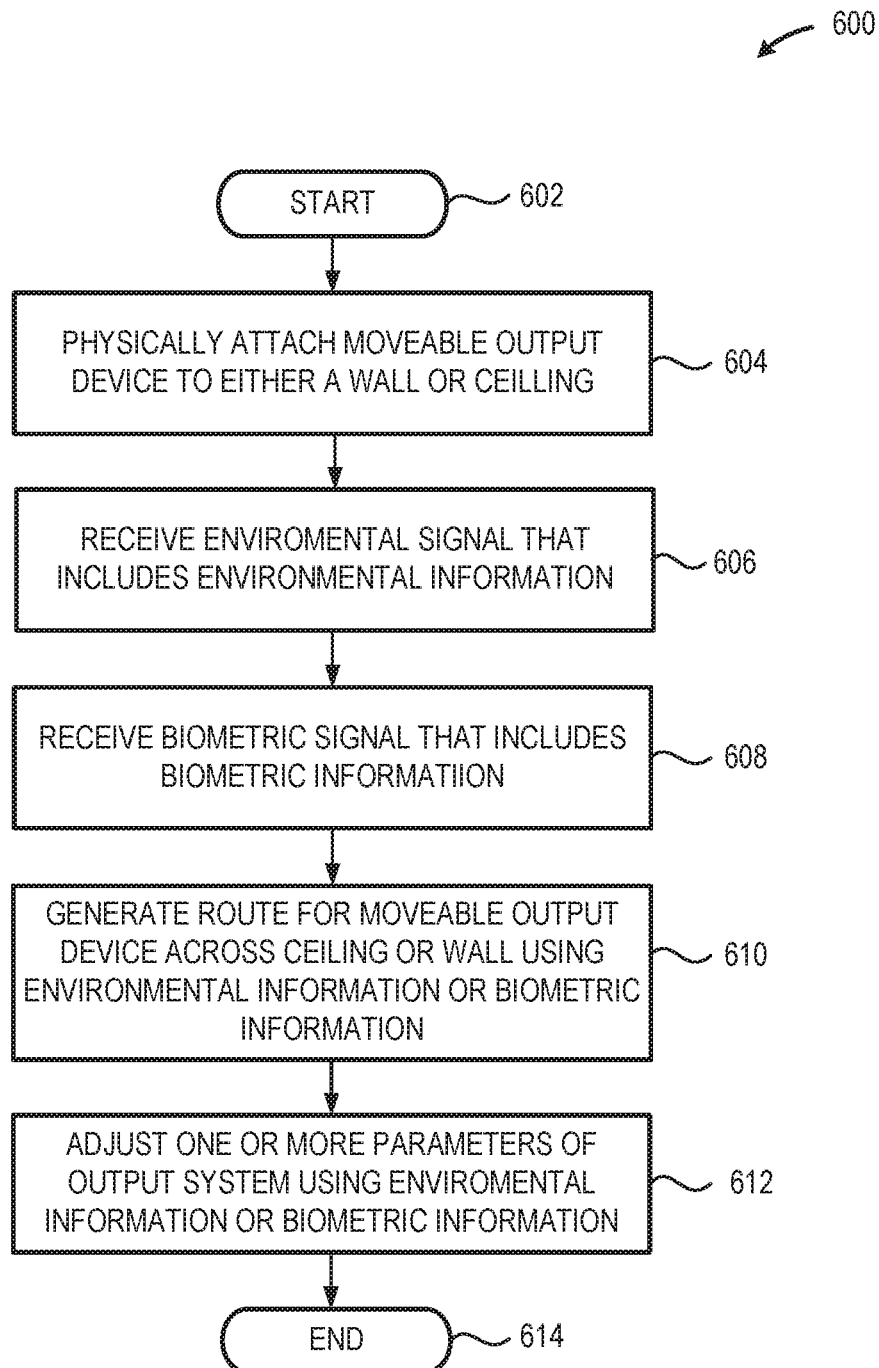
FIG. 6 is a high-level flow diagram of an illustrative method of generating output using a moveable output device such as described in FIGS. 1 through 5, in accordance with at least one embodiment described herein.

FIG. 6 is a high-level flow diagram of an illustrative method 600 of generating output using a moveable output device 100 such as described in FIGS. 1 through 5, in accordance with at least one embodiment described herein. The method commences at 602.

At 604, a moveable output device 110 is physically coupled to a surface defining an area that includes at least one subject 130. In some implementations, the moveable output device 110 may be physically coupled to a wall that defines at least a portion of the area. In some implementations, the moveable output device 110 may be physically coupled to a ceiling that defines at least a portion of the area. In embodiments, the physical coupling of the moveable output device 110 to a wall 204, 206 or ceiling 205 may be accomplished using a surface coupling assembly that includes a magnetic wheel rotatably coupled to the moveable output device 110 and one or more magnetic materials disposed in, on, about, or behind the respective ceiling 205 or wall 204, 206. Example magnetic materials may include, but are not limited to, magnetic strips, plates, lattice, or similar disposed in, on, about, behind, or across all or a portion of the wall 204, 206 or ceiling 205. The magnetic wheel in the surface coupling assembly may include, but is not limited to, a rotatable member that includes one or more disc magnets, one or more rare-earth magnets, or one or more electromagnets.

At 606, one or more environmental sensors 112 included in the environmental detection system may provide to the control circuitry 122 an environmental signal that includes information and/or data associated with the environment about the output device 110 and/or subject 130. The environmental signal 112 may include purely environmental information (e.g., ambient temperature, geolocation, and similar) or both environmental and biometric information (e.g., a still image, a series of images forming a video, or similar).

At 608, one or more biometric sensors 112 included in the biometric detection system may provide to the control circuitry 122 a biometric signal that includes information and/or data associated with the subject 130. The biometric signal 112 may include purely biometric information (i.e., facial recognition, facial expression, fingerprint information, and similar) or both environmental and biometric information (e.g., Intel REALSENSE®).

At 610, the control circuitry 122 generates a route for the moveable output device 110. The control circuitry 122 may generate the routing information, based at least in part, on the environmental information received from the environmental detection system and/or the biometric information received from the biometric detection system. In some implementations, the control circuitry 122 may generate routing information that tracks or otherwise follows the subject 130 across or around the area. For example, the moveable output device 110 may track the movement of the subject 130 through the area defined by the walls 204, 206 and ceiling 205. In other embodiments, the control circuitry 122 may determine a routing to position the moveable output device 110 at a location where augmented reality (AR) information may be projected onto identified objects. For example, the control circuitry 122 may cause a moveable output device 110 to follow the movement of a subject 130 in an art gallery.

At 612, the control circuitry 122 adjusts one or more output parameters of the output system 118. In embodiments, the control circuitry 122 may adjust the one or more output parameters based, at least in part, on the environmental information received from the environmental detection system and/or the biometric information received from the biometric detection system. Continuing with the prior example of a subject 130 in an art gallery. As the subject 130 views each piece of art, the control circuitry 122 may cause an output system 118 that includes a projector to project information associated with the respective piece of art on the floor or wall proximate the piece of art and the subject 130. To assist the subject 130 with navigation through the art gallery, as the biometric detection system detects the subject 130 moving away from the piece of art, the control circuitry 122 may cause the output system 118 to display a directional arrow that shows the subject 130 the way to the next exhibit or to the exit of the art gallery. In another embodiment, the control circuitry 122 may communicate or transmit augmented reality information to one or more processor-based devices worn by the subject 130. The method 600 concludes at 612.

While FIG. 6 illustrates various operations according to one or more embodiments, it is to be understood that not all of the operations depicted in FIG. 6 are necessary for other embodiments. Indeed, it is fully contemplated herein that in other embodiments of the present disclosure, the operations depicted in FIG. 6, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., non-volatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), rewritable compact disks (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eM-MCs), secure digital input/output (SDIO) cards, magnetic or optical cards, or any type of media suitable for storing electronic instructions. Other embodiments may be implemented as software executed by a programmable control device.

Thus, the present disclosure is directed to systems and methods for providing a moveable output device capable of autonomous (i.e., localized decision-making within the device itself) or semi-autonomous (i.e., shared decision-making based on communications with one or more other moveable output devices and/or one or more remote resources). The moveable output device includes a surface coupling assembly to couple the device to a wall or ceiling and a propulsion system to move the device along the walls or ceiling. The device also includes an environmental detection system and a biometric detection system to collect environmental and/or biometric information used by the control circuitry to determine a routing for the device and to determine adjustments to one or more output system parameters. The routing and output parameters may be based on movements, gestures, and similar made by the subject.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for providing dielectric layer compatible with the formation of very high-density interconnects (≥100 IO/mm) on a semiconductor substrate.

According to example 1, there is provided a moveable output device. The moveable output device may include: a surface coupling assembly to physically attach the moveable output device to at least one of: a vertical surface or an inverted surface; a propulsion system to displace the moveable output device across at least one of: the vertical surface or the inverted surface; at least one environmental detection system to generate an environmental signal that includes environmental information; at least one biometric detection system to generate a biometric signal that includes biometric information; at least one output system; control circuitry; at least one non-transitory memory to store at least one machine-readable instruction set that when executed by the control circuitry, causes the control circuitry to: receive at least one of: the environmental signal or the biometric signal; and using at least one of the received biometric information or the received environmental information: generate a routing for the moveable output device across at least one of: the vertical surface or the inverted surface; and adjust one or more output parameters of the at least one output system.

Example 2 may include elements of example 1 where the at least one machine-readable instruction set may further cause the control circuitry to: generate at least one output signal including information indicative of at least one biometric event or at least one environmental event; and transmit the at least one output signal to at least one other moveable output device.

Example 3 may include elements of example 2 where the at least one machine-readable instruction set that causes the control circuitry to transmit the at least one output signal to at least one other moveable output device may further cause the control circuitry to: transmit the at least one output signal to a gateway device coupled to a world-wide network.

Example 4 may include elements of example 1 where the at least one machine-readable instruction set may further cause the control circuitry to: receive at least one instruction from a remote device; and generate the routing for the moveable output device based at least in part on the received at least instruction.

Example 5 may include elements of example 1 where the at least one machine-readable instruction set that causes the control circuitry to receive at least one instruction from a remote device may further cause the control circuitry to: receive at least one instruction from a second moveable output device.

Example 6 may include elements of example 1 where the output system may include a transceiver communicably coupled to a wearable output device and the one or more output parameters include at least one of: a content element included in the wearable output device; an augmented reality (AR) content element included in the wearable output device; a haptic output of the wearable output device; or an ON/OFF state of the wearable output device.

Example 7 may include elements of example 1 where the output system may include a luminaire and the one or more output parameters include at least one of: a luminous output level of the luminaire; a color temperature of a luminous output of the luminaire; or an ON/OFF state of the luminaire.

Example 8 may include elements of example 1 where the output system may include a projector and the one or more output parameters include at least one of: a content element included in the projector output; or an ON/OFF state of the projector.

Example 9 may include elements of example 1 where the output system may include an audio output device and the one or more output parameters include at least one of: a content element included in the audio output device output; an audio output level; or an ON/OFF state of the audio output device.

Example 10 may include elements of example 1 where the at least one biometric detection system may include at least one of: an eye tracking sensor; a facial recognition system; a facial expression recognition system; a gesture detection system; a voice recognition system; an iris recognition system; or a handwriting recognition system.

Example 11 may include elements of example 1 where the propulsion system may include a motor operably coupled to a rotatable wheel.

Example 12 may include elements of example 1 where the surface coupling assembly may include a magnetic wheel assembly.

Example 13 may include elements of example 12 where the magnetic wheel assembly may include at least one rotatably-coupled, disc-shaped, magnet.

Example 14 may include elements of example 12 where the magnetic wheel assembly comprises a plurality of magnets disposed in at least one rotatably-coupled, disc-shaped, member.

Example 15 may include elements of example 1 where the at least one environmental sensor may include at least one of: a distance measurement sensor; a humidity sensor; a visible image acquisition sensor; an infrared image acquisition sensor; a geolocation sensor; or a location detection sensor.

According to example 16 there is provided an automated output method. The method may include physically attaching a moveable output device to at least one of: a vertical surface that defines an area occupied by a subject or an inverted surface that defines the area occupied by the subject; receiving, by control circuitry in the mobile output device, an environmental signal that includes environmental information associated with the area, from an environmental detection system; receiving, by the control circuitry, a biometric signal that includes biometric information associated with the subject in the area, from a biometric detection system; generating, by the control circuitry, a routing for the moveable output device across at least one of: a vertical surface defining at least a portion of the area or an inverted surface defining at least a portion of the area, the routing generated based at least in part on at least one of the environmental signal or the biometric signal; and adjusting, by the control circuitry, one or more output parameters of at least one output system disposed in the mobile output device, the one or more output parameters adjusted based at least in part on at least one of the environmental signal or the biometric signal.

Example 17 may include elements of example 16, and the method may additionally include causing, by the control circuitry, a propulsion system to displace the moveable output device across at least one of: the vertical surface or the inverted surface.

Example 18 may include elements of example 16 where physically attaching a moveable output device to at least one of: a vertical surface or an inverted surface may include: magnetically physically attaching the moveable output device to at least one of: the vertical surface or the inverted surface.

Example 19 may include elements of example 16 where receiving, from an environmental detection system, an environmental signal that includes environmental information associated with the area may include: receiving an environmental signal that includes environmental information associated with the area using an environmental detection system that includes at least one of: a distance measurement sensor; a humidity sensor; a visible image acquisition sensor; an infrared image acquisition sensor; a geolocation sensor; or a location detection sensor.

Example 20 may include elements of example 16 where receiving, from a biometric detection system, a biometric signal that includes biometric information associated with the subject in the area may include: receiving a biometric signal that includes biometric information associated with the subject in the area from a biometric detection system that includes at least one of: an eye tracking sensor; a facial recognition system; a facial expression recognition system; a gesture detection system; a voice recognition system; an iris recognition system; or a handwriting recognition system.

Example 21 may include elements of example 16 where adjusting one or more output parameters of at least one output system may include: adjusting one or more output parameters of at least one output system that includes a transceiver communicably coupled to a wearable output device and the one or more output parameters include at least one of: a content element included in the wearable output device; an augmented reality (AR) content element included in the wearable output device; a haptic output of the wearable output device; or an ON/OFF state of the wearable output device.

Example 22 may include elements of example 16 where adjusting one or more output parameters of at least one output system may include: adjusting one or more output parameters of at least one output system that includes a luminaire and the one or more output parameters include at least one of: a luminous output level of the luminaire; a color temperature of a luminous output of the luminaire; or an ON/OFF state of the luminaire.

Example 23 may include elements of example 16 where adjusting one or more output parameters of at least one output system may include: adjusting one or more output parameters of at least one output system that includes a projector and the one or more output parameters include at least one of: a content element included in the projector output; or an ON/OFF state of the projector.

Example 24 may include elements of example 16, and the method may additionally include: identifying, by the control circuit, one or more objects in the area; wherein adjusting one or more output parameters of at least one output system may include: adjusting one or more output parameters of at least one output system that includes a projector and the one or more output parameters include information associated with the identified one or more objects.

Example 25 may include elements of example 24 where adjusting one or more output parameters that include information associated with the identified one or more objects further may include: projecting the information associated with each of the identified one or more objects proximate the respective object.

Example 26 may include elements of example 16 where adjusting one or more output parameters of at least one output system may include: adjusting one or more output parameters of at least one output system that includes an audio output device and the one or more output parameters include at least one of: a content element included in the audio output device output; an audio output level; or an ON/OFF state of the audio output device.

According to example 27, there is provided a non-transitory machine readable storage medium containing at least one instruction set that, when executed, causes a control circuit disposed in a moveable output device physically attached to at least one of: a vertical surface that defines an area occupied by a subject or an inverted surface that defines the area occupied by the subject to: receive an environmental signal that includes environmental information associated with the area, from an environmental detection system; receive a biometric signal that includes biometric information associated with the subject in the area, from a biometric detection system; generate a routing for the moveable output device across at least one of: a vertical surface defining at least a portion of the area or an inverted surface defining at least a portion of the area, the routing generated based at least in part on at least one of the environmental signal or the biometric signal; and adjust one or more output parameters of at least one output system disposed in the mobile output device, the one or more output parameters adjusted based at least in part on at least one of the environmental signal or the biometric signal.

Example 28 may include elements of example 27 where the at least one instruction set may further cause the control circuit to: cause a propulsion system to displace the moveable output device across at least one of: the vertical surface or the inverted surface.

Example 29 may include elements of example 27 where the machine-readable instructions that cause the control circuitry to receive an environmental signal that includes environmental information associated with the area may further cause the control circuitry to: receive an environmental signal that includes environmental information associated with the area using an environmental detection system that includes at least one of: a distance measurement sensor; a humidity sensor; a visible image acquisition sensor; an infrared image acquisition sensor; a geolocation sensor; or a location detection sensor.

Example 30 may include elements of example 27 where the machine-readable instructions that cause the control circuitry to receive a biometric signal that includes biometric information associated with the subject in the area may further cause the control circuitry to: receive a biometric signal that includes biometric information associated with the subject in the area from a biometric detection system that includes at least one of: an eye tracking sensor; a facial recognition system; a facial expression recognition system; a gesture detection system; a voice recognition system; an iris recognition system; or a handwriting recognition system.

Example 31 may include elements of example 27 where the machine-readable instructions that cause the control circuitry to adjust one or more output parameters of at least one output system may further cause the control circuitry to: adjust one or more output parameters of at least one output system that includes a transceiver communicably coupled to a wearable output device and the one or more output parameters include at least one of: a content element included in the wearable output device; an augmented reality (AR) content element included in the wearable output device; a haptic output of the wearable output device; or an ON/OFF state of the wearable output device.

Example 32 may include elements of example 27 where the machine-readable instructions that cause the control circuitry to adjust one or more output parameters of at least one output system may further cause the control circuitry to: adjust one or more output parameters of at least one output system that includes a luminaire and the one or more output parameters include at least one of: a luminous output level of the luminaire; a color temperature of a luminous output of the luminaire; or an ON/OFF state of the luminaire.

Example 33 may include elements of example 27 where the machine-readable instructions that cause the control circuitry to adjust one or more output parameters of at least one output system may further cause the control circuitry to: adjust one or more output parameters of at least one output system that includes a projector and the one or more output parameters include at least one of: a content element included in the projector output; or an ON/OFF state of the projector.

Example 34 may include elements of example 27 where the machine-readable instructions may further cause the control circuitry to: identify one or more objects in the area; wherein the machine-readable instructions that cause the control circuitry to adjust one or more output parameters of at least one output system further cause the control circuitry to: adjust one or more output parameters of at least one output system that includes a projector where the one or more output parameters include information associated with the identified one or more objects.

Example 35 may include elements of example 34 where the machine-readable instructions that cause the control circuitry to adjust one or more output parameters that include information associated with the identified one or more objects may further cause the control circuitry to:

project the information associated with each of the identified one or more objects proximate the respective object.

Example 36 may include elements of example 27 where the machine-readable instructions that cause the control circuitry to adjust one or more output parameters of at least one output system may further cause the control circuitry to: adjust one or more output parameters of at least one output system that includes an audio output device and the one or more output parameters include at least one of: a content element included in the audio output device output; an audio output level; or an ON/OFF state of the audio output device.

According to example 37, there is provided an automated output system. The automated output system may include: a means for physically attaching a moveable output device to at least one of: a vertical surface that defines an area occupied by a subject or an inverted surface that defines the area occupied by the subject; a means for receiving an environmental signal that includes environmental information associated with the area; a means for receiving a biometric signal that includes biometric information associated with the subject in the area; a means for generating a routing for the moveable output device across at least one of: a vertical surface defining at least a portion of the area or an inverted surface defining at least a portion of the area, the routing generated based at least in part on at least one of the environmental signal or the biometric signal; and a means for adjusting one or more output parameters of at least one output system disposed in the mobile output device, the one or more output parameters adjusted based at least in part on at least one of the environmental signal or the biometric signal.

Example 38 may include elements of example 37, and the system may further include: a means for displacing the moveable output device across at least one of: the vertical surface or the inverted surface.

Example 39 may include elements of example 37 where the means for physically attaching a moveable output device to at least one of: a vertical surface or an inverted surface may include: a magnetic means for physically attaching the moveable output device to at least one of: the vertical surface or the inverted surface.

Example 40 may include elements of example 37 where the means for receiving an environmental signal that includes environmental information associated with the area may include: a means for receiving an environmental signal that includes environmental information associated with the area using an environmental detection system that includes at least one of: a distance measurement sensor; a humidity sensor; a visible image acquisition sensor; an infrared image acquisition sensor; a geolocation sensor; or a location detection sensor.

Example 41 may include elements of example 37 where the means for receiving a biometric signal that includes biometric information associated with the subject in the area may include: a means for receiving a biometric signal that includes biometric information associated with the subject in the area from a biometric detection system that includes at least one of: an eye tracking sensor; a facial recognition system; a facial expression recognition system; a gesture detection system; a voice recognition system; an iris recognition system; or a handwriting recognition system.

Example 42 may include elements of example 37 where the means for adjusting one or more output parameters of at least one output system may include: a means for adjusting one or more output parameters of at least one output system that includes a transceiver communicably coupled to a wearable output device and the one or more output parameters include at least one of: a content element included in the wearable output device; an augmented reality (AR) content element included in the wearable output device; a haptic output of the wearable output device; or an ON/OFF state of the wearable output device.

Example 43 may include elements of example 37 where the means for adjusting one or more output parameters of at least one output system may include: a means for adjusting one or more output parameters of at least one output system that includes a luminaire and the one or more output parameters include at least one of: a luminous output level of the luminaire; a color temperature of a luminous output of the luminaire; or an ON/OFF state of the luminaire.

Example 44 may include elements of example 37 where the means for adjusting one or more output parameters of at least one output system may include: a means for adjusting one or more output parameters of at least one output system that includes a projector and the one or more output parameters include at least one of: a content element included in the projector output; or an ON/OFF state of the projector.

Example 45 may include elements of example 37 and the system may additionally include: a means for identifying one or more objects in the area; wherein the means for adjusting one or more output parameters of at least one output system may include: a means for adjusting one or more output parameters of at least one output system that includes a projector and the one or more output parameters include information associated with the identified one or more objects.

Example 46 may include elements of example 45 where the means for adjusting one or more output parameters that include information associated with the identified one or more objects may further include: a means for displaying the information associated with each of the identified one or more objects proximate the respective object.

Example 47 may include elements of example 37 where the means for adjusting one or more output parameters of at least one output system may include: a means for adjusting one or more output parameters of at least one output system that includes an audio output device and the one or more output parameters include at least one of: a content element included in the audio output device output; an audio output level; or an ON/OFF state of the audio output device.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:
1. A moveable output device, comprising:
   a surface coupling assembly to physically attach the moveable output device to at least one of: a vertical surface or an inverted surface;
   a propulsion system to displace the moveable output device across at least one of: the vertical surface or the inverted surface;
   at least one environmental detection system to generate an environmental signal that includes environmental information;
   at least one biometric detection system to generate a biometric signal that includes biometric information;
   at least one output system;
   control circuitry;

at least one non-transitory memory to store at least one machine-readable instruction set that when executed by the control circuitry, causes the control circuitry to:
receive at least one of: the environmental signal or the biometric signal; and
using at least one of the received biometric information or the received environmental information:
generate a routing for the moveable output device across at least one of: the vertical surface or the inverted surface; and
adjust one or more output parameters of the at least one output system.

2. The moveable output device of claim 1 wherein the at least one machine-readable instruction set further causes the control circuitry to:
generate at least one output signal including information indicative of at least one biometric event or at least one environmental event; and
transmit the at least one output signal to at least one other moveable output device.

3. The moveable output device of claim 2 wherein the at least one machine-readable instruction set that causes the control circuitry to transmit the at least one output signal to at least one other moveable output device further causes the control circuitry to:
transmit the at least one output signal to a gateway device coupled to a world-wide network.

4. The moveable output device of claim 1 wherein the at least one machine-readable instruction set further causes the control circuitry to:
receive at least one instruction from a remote device; and
generate the routing for the moveable output device based at least in part on the received at least instruction.

5. The moveable output device of claim 1 wherein the at least one machine-readable instruction set that causes the control circuitry to receive at least one instruction from a remote device further causes the control circuitry to:
receive at least one instruction from a second moveable output device.

6. The moveable output device of claim 1 wherein the output system comprises a transceiver communicably coupled to a wearable output device and the one or more output parameters include at least one of: a content element included in the wearable output device; an augmented reality (AR) content element included in the wearable output device; a haptic output of the wearable output device; or an ON/OFF state of the wearable output device.

7. The moveable output device of claim 1 wherein the output system comprises a luminaire and the one or more output parameters include at least one of: a luminous output level of the luminaire; a color temperature of a luminous output of the luminaire; or an ON/OFF state of the luminaire.

8. The moveable output device of claim 1 wherein the output system comprises a projector and the one or more output parameters include at least one of: a content element included in the projector output; or an ON/OFF state of the projector.

9. The moveable output device of claim 1 wherein the output system comprises an audio output device and the one or more output parameters include at least one of: a content element included in the audio output device output; an audio output level; or an ON/OFF state of the audio output device.

10. The moveable output device of claim 1 wherein the at least one biometric detection system comprises at least one of: an eye tracking sensor; a facial recognition system; a facial expression recognition system; a gesture detection system; a voice recognition system; an iris recognition system; or a handwriting recognition system.

11. The moveable output device of claim 1 wherein the propulsion system comprises a motor operably coupled to a rotatable wheel.

12. The moveable output device of claim 1 wherein the surface coupling assembly comprises a magnetic wheel assembly.

13. The moveable output device of claim 12 wherein the magnetic wheel assembly comprises at least one rotatably-coupled, disc-shaped, magnet.

14. The moveable output device of claim 12 wherein the magnetic wheel assembly comprises a plurality of magnets disposed in at least one rotatably-coupled, disc-shaped, member.

15. The moveable output device of claim 1 wherein the at least one environmental sensor comprises at least one of: a distance measurement sensor; a humidity sensor; a visible image acquisition sensor; an infrared image acquisition sensor; a geolocation sensor; or a location detection sensor.

16. An automated output method, comprising:
physically attaching a moveable output device via a surface coupling assembly to a first surface that at least partially defines an area occupied by a subject, wherein the first surface is a vertical surface or an inverted surface, and wherein the moveable output device includes the surface coupling assembly;
receiving, by control circuitry in the moveable output device, an environmental signal that includes environmental information associated with the area, from an environmental detection system;
receiving, by the control circuitry, a biometric signal that includes biometric information associated with the subject in the area, from a biometric detection system;
generating, by the control circuitry and based at least in part on at least one of the environmental signal or the biometric signal, a routing for the moveable output device across the first surface; and
adjusting, by the control circuitry, one or more output parameters of at least one output system disposed in the moveable output device, the one or more output parameters adjusted based at least in part on at least one of the environmental signal or the biometric signal; and
causing, by the control circuitry, a propulsion system to displace the moveable output device across the first surface.

17. The method of claim 16 wherein physically attaching the moveable output device to the first surface comprises:
magnetically physically attaching the moveable output device to the first surface.

18. The method of claim 16 wherein receiving, from an environmental detection system, an environmental signal that includes environmental information associated with the area comprises:
receiving an environmental signal that includes environmental information associated with the area using an environmental detection system that includes at least one of: a distance measurement sensor; a humidity sensor; a visible image acquisition sensor; an infrared image acquisition sensor; a geolocation sensor; or a location detection sensor.

19. The method of claim 16 wherein receiving, from a biometric detection system, a biometric signal that includes biometric information associated with the subject in the area comprises:
receiving a biometric signal that includes biometric information associated with the subject in the area from a biometric detection system that includes at least one of: an eye tracking sensor; a facial recognition system; a facial expression recognition system; a gesture detection system; a voice recognition system; an iris recognition system; or a handwriting recognition system.

20. The method of claim 16 wherein adjusting one or more output parameters of at least one output system comprises:
adjusting one or more output parameters of at least one output system that includes a transceiver communicably coupled to a wearable output device and the one or more output parameters include at least one of: a content element included in the wearable output device; an augmented reality (AR) content element included in the wearable output device; a haptic output of the wearable output device; or an ON/OFF state of the wearable output device.

21. The method of claim 16 wherein adjusting one or more output parameters of at least one output system comprises:
adjusting one or more output parameters of at least one output system that includes a luminaire and the one or more output parameters include at least one of: a luminous output level of the luminaire; a color temperature of a luminous output of the luminaire; or an ON/OFF state of the luminaire.

22. The method of claim 16 wherein adjusting one or more output parameters of at least one output system comprises:
adjusting one or more output parameters of at least one output system that includes a projector and the one or more output parameters include at least one of: a content element included in the projector output; or an ON/OFF state of the projector.

23. The method of claim 16 wherein adjusting one or more output parameters of at least one output system comprises:
adjusting one or more output parameters of at least one output system that includes an audio output device and the one or more output parameters include at least one of: a content element included in the audio output device output; an audio output level; or an ON/OFF state of the audio output device.

24. A non-transitory machine readable storage medium containing at least one instruction set that when executed causes a control circuit, disposed in a moveable output device that is physically attached via a surface coupling assembly to a first surface that at least partially defines an area occupied by a subject, to:
receive an environmental signal that includes environmental information associated with the area, from an environmental detection system;
receive a biometric signal that includes biometric information associated with the subject in the area, from a biometric detection system;
generate a routing for the moveable output device across the first surface, the routing generated based at least in part on at least one of the environmental signal or the biometric signal;
cause a propulsion system to displace the moveable output device across the first surface; and
adjust one or more output parameters of at least one output system disposed in the moveable output device, the one or more output parameters adjusted based at least in part on at least one of the environmental signal or the biometric signal;
wherein the first surface is a vertical surface or an inverted surface and wherein the moveable output device includes the surface coupling assembly.

* * * * *